(12) United States Patent
Kami et al.

(10) Patent No.: US 7,647,485 B2
(45) Date of Patent: Jan. 12, 2010

(54) DATA PROCESSING SYSTEM FOR DEBUGGING UTILIZING HALTS IN A PARALLEL DEVICE

(75) Inventors: Hirokazu Kami, Minato-ku (JP); Takao Toi, Minato-ku (JP); Toru Awashima, Minato-ku (JP); Kenichiro Anjo, Kawasaki (JP); Koichiro Furuta, Kawasaki (JP); Taro Fujii, Kawasaki (JP); Masato Motomura, Kawasaki (JP)

(73) Assignees: NEC Corporation, Tokyo (JP); NEC Electronics Corporation, Kanagawa (JP)

( * ) Notice: Subject to any disclaimer, the term of this patent is extended or adjusted under 35 U.S.C. 154(b) by 610 days.

(21) Appl. No.: 10/927,377

(22) Filed: Aug. 27, 2004

(65) Prior Publication Data

US 2005/0050522 A1 Mar. 3, 2005

(30) Foreign Application Priority Data

Aug. 29, 2003 (JP) ............................. 2003-307061

(51) Int. Cl.
*G06F 9/00* (2006.01)
(52) U.S. Cl. ........................................ 712/227; 712/10
(58) Field of Classification Search ................. 712/227, 712/220, 10
See application file for complete search history.

(56) References Cited

U.S. PATENT DOCUMENTS

| 5,602,729 | A | * | 2/1997 | Krueger et al. ............... 717/124 |
| 5,867,644 | A | * | 2/1999 | Ranson et al. ................ 714/39 |
| 6,003,107 | A | * | 12/1999 | Ranson et al. ............... 710/316 |
| 6,173,386 | B1 | * | 1/2001 | Key et al. ...................... 712/10 |
| 6,281,703 | B1 | | 8/2001 | Furuta et al. |
| 6,339,341 | B1 | | 1/2002 | Fujii et al. |
| 6,356,109 | B1 | | 3/2002 | Furuta et al. |
| 6,424,171 | B1 | | 7/2002 | Motomura et al. |
| 6,502,209 | B1 | * | 12/2002 | Bengtsson et al. ............ 714/35 |
| 2003/0046513 | A1 | | 3/2003 | Furuta et al. |
| 2003/0061601 | A1 | | 3/2003 | Toi et al. |

FOREIGN PATENT DOCUMENTS

| JP | 3-189737 A | 8/1991 |
| JP | 4-219834 A | 8/1992 |
| JP | 5-81069 A | 4/1993 |
| JP | 5-108408 A | 4/1993 |

(Continued)

*Primary Examiner*—Alford W Kindred
*Assistant Examiner*—Benjamin P Geib
(74) *Attorney, Agent, or Firm*—Sughrue Mion, PLLC

(57) ABSTRACT

A data processing device for debugging code for a parallel arithmetic device that includes a plurality of data processing circuits arranged in a matrix and that causes, for each operating cycle, successive transitions of operation states in accordance with object code includes: operation execution means for causing the parallel arithmetic device to execute state transitions by means of the object code; device halt means for temporarily halting the state transitions for each operating cycle; a result output means for reading and supplying as output at least a portion of held data, connection relations, and operation commands of the plurality of data processing circuits of the halted parallel arithmetic device; a resume input means for receiving as input a resume command of the state transitions; and an operation resumption means for causing the operation execution means to resume the state transitions upon input of a resume command.

30 Claims, 7 Drawing Sheets

FOREIGN PATENT DOCUMENTS

| | | |
|---|---|---|
| JP | 5-151025 A | 6/1993 |
| JP | 5-197585 A | 8/1993 |
| JP | 6-242943 A | 9/1994 |
| JP | 7-200350 A | 8/1995 |
| JP | 9-259002 A | 10/1997 |
| JP | 10-283222 A | 10/1998 |
| JP | 11-232091 A | 8/1999 |
| JP | 2000-47902 A | 2/2000 |
| JP | 2000-138579 A | 5/2000 |
| JP | 2000-232162 A | 8/2000 |
| JP | 2000-232354 A | 8/2000 |
| JP | 2002-224025 A | 8/2000 |
| JP | 2001-5688 A | 1/2001 |
| JP | 2001-154874 A | 6/2001 |
| JP | 2003-76668 A | 3/2003 |
| JP | 2003-099409 A | 4/2003 |
| JP | 2003-99409 A | 4/2003 |

* cited by examiner

DATA PROCESSING SYSTEM FOR DEBUGGING UTILIZING HALTS IN A PARALLEL DEVICE

BACKGROUND OF THE INVENTION

1. Field of the Invention

The present invention relates to a data processing system for debugging at least one of source code and object code of a parallel arithmetic device.

2. Description of the Related Art

Currently, CPUs (Central Processing Units) and MPUs (Micro Processor Units) are widely used as processor units that are capable of arbitrarily and flexibly executing various types of data processing. In a data processing system that employs such a processor unit, various types of object code that describes the operation commands for the processing that is to be executed and the data that are the object of processing are stored in a memory device, and the processor unit successively reads the operation commands and data from the memory device and successively executes the designated data processing. Looking at a single processor unit, although this processor unit can execute various types of data processing according to the object code, when executing a plurality of processes or tasks, the processor unit executes these processes successively in order. During this successive data processing, the processor unit must read the operation commands from the memory device, and the high-speed execution of complex data processing using a single processor unit is therefore problematic.

On the other hand, when the data processing that is to be executed is limited to a single type, arranging logic circuits as hardware to execute this type of data processing eliminates the overhead that accompanies the reading of operation commands and allows the high-speed execution of the complex data processing. However, a system that depends upon this type of hardware logic is obviously capable of executing only a single type of data processing that has been determined in advance.

A data processing system that is capable of executing any desired object code can execute various types of data processing, but the high-speed execution of data processing is problematic because the hardware configuration is not optimized for a specific type of data processing. A system that is made up of dedicated hardware for executing specific data processing allows the high-speed execution of this data processing, but is not capable of other types of data processing.

To provide a solution to this type of trade-off, the assignee of the present invention has proposed a parallel arithmetic device as a processor unit in which the hardware configuration changes in accordance with software. In this parallel arithmetic device, a multiplicity of relatively small-scale data processing circuits and interconnection switching circuits are arranged as a matrix, and this matrix circuit is provided with a state management unit.

For each data processing circuit, operation commands are set separately, and data processing is executed separately according to these set operation commands. Each interconnection switching circuit is also separately set with operation commands, and each interconnection switching circuit thus switches and controls the interconnection of the data processing circuits according to the set operation command. Still further, the state management unit, in accordance with object code, successively switches contexts for each operating cycle, these contexts being composed of the operation commands of the above-described plurality of data processing circuits and the plurality of interconnection switching circuits.

This parallel arithmetic device, by switching the operation commands that are set to a plurality of data processing circuits and a plurality of interconnection switching circuits, allows the substantial alteration of the hardware configuration and thus allows the execution of various types of data processing. In particular, the execution of simple data processing in parallel by a multiplicity of small-scale data processing circuits enables the execution of high-speed data processing. Further, the switching of contexts by the state management unit enables the parallel arithmetic device to continuously execute parallel processing in accordance with object code. This type of parallel arithmetic device is described in, for example, Japanese Patent Laid-Open Publication No. 2000-138579 (JP P2000-138579A) corresponding to U.S. Pat. No. 6,424,171, Japanese Patent Laid-Open Publication No. 2000-224025 (JP P2000-224025A) corresponding to U.S. Pat. No. 6,281,703, Japanese Patent Laid-Open Publication No. 2000-232354 (JP P2000-232354A) corresponding to U.S. Pat. No. 6,339,341, Japanese Patent Laid-Open Publication No. 2000-232162 (JP P2000-232162A) corresponding to U.S. Pat. No. 6,356,109, Japanese Patent Laid-Open Publication No. 2003-76668 (JP P2003-76668A) corresponding to U.S. Patent Application Publication No. 2003/0046513, Japanese Patent Laid-Open Publication No. 2003-99409 (JP P2003-99409A) corresponding to U.S. Patent Application Publication No. 2003/0061601, and Lawrence Snyder, "Introduction to the Configurable, Highly Parallel Computer," IEEE Computer, Vol. 15, No. 1, January 1982, pp. 47-56.

In the above-described parallel arithmetic devices, a state management unit successively switches contexts that are contained in object code for each operating cycle, whereby a plurality of data processing circuits and a plurality of interconnection switching circuits that are arranged in a matrix form can perform parallel operations for each operating cycle in accordance with the contexts. However, both the configuration and operation of a parallel arithmetic device differ fundamentally from a conventional CPU, and as a result, simple debugging of the object code and/or source code by a conventional method is no longer possible.

SUMMARY OF THE INVENTION

It is an object of the present invention to provide a data processing system that supports debugging of the source program and object code of a parallel arithmetic device and that facilitates the task of debugging.

The object of the present invention can be achieved by a data processing system that is suitable for a parallel arithmetic device that includes a plurality of data processing circuits for individually executing modifiable data processing and a plurality of interconnection switching circuits for switch-controlling the interconnection relations of the plurality of data processing circuits, wherein the plurality of data processing circuits and a plurality of interconnection switching circuits are arranged in a matrix; wherein the data processing system debugs at least one of operation description source code and object code for causing, for each operating cycle, successive transitions of operation states of a plurality of stages of this parallel arithmetic device.

According to the first aspect of the present invention, when the parallel arithmetic device includes a function for temporarily halting state transitions, the data processing system includes: an operation execution means for causing the parallel arithmetic device to execute the state transitions in accordance with the object code: a device halt means for temporarily halting the state transitions for each operating cycle of the parallel arithmetic device; a result output means for supplying as output at least one part of held data, the interconnection relations, and the operation commands of the plurality of data processing circuits of the parallel arithmetic device that has been temporarily halted; a resume input means for supplying as input a command to resume state transitions; and an operation resumption means for causing the operation execution means to resume state transitions upon the input of the resume command.

In this data processing system, various types of data of a parallel arithmetic device that makes state transitions in accordance with object code can be successively checked by temporarily halting, for each operating cycle, the state transitions of the parallel arithmetic device in accordance with the object code and causing the supply of various types of data; and then causing the resumption of the state transitions of the parallel arithmetic device upon the input of the command to resume state transitions. In addition, the object code and/or source code of the parallel arithmetic device can be effectively debugged because the temporary halt of the parallel arithmetic device can be swiftly released.

According to the second aspect of the present invention, a data processing system includes: an operation execution means for causing the parallel arithmetic device to execute the state transitions in accordance with the object code; a halt input means for receiving as input a halt command for the parallel arithmetic device together with a specific operation state; a device halt means for causing a temporary halt of the state transitions of the parallel arithmetic device during the operation state that was received together with the halt command; and a result output means for supplying as output at least one part of the held data, the interconnection relations, and the operation commands of the plurality of data processing circuits of the parallel arithmetic device that has been temporarily halted.

In this data processing system, when the halt command for the parallel arithmetic device is received together with the specific operation state, the state transitions of the parallel arithmetic device are temporarily halted during that operation state and various data are supplied as output from the parallel arithmetic device, whereby the parallel arithmetic device can be temporarily halted and the various data can be checked in a desired operation state, and whereby the object code and/or source code of the parallel arithmetic device can be effectively debugged.

According to a third aspect of the present invention, a data processing system includes: an operation execution means for causing the parallel arithmetic device to execute the state transitions in accordance with the object code; a halt input means for receiving as input a halt command for the parallel arithmetic device together with a halt condition that uses at least a portion of held data of the plurality of data processing circuits; a device halt means for temporarily halting the state transitions of the parallel arithmetic device when the halt condition is satisfied; and a result output means for supplying as output at least one part of the held data, the interconnection relations, and the operation commands of the plurality of data processing circuits of the parallel arithmetic device that has been temporarily halted.

In this data processing system, when the halt command device is received as input together with a halt condition that employs the held data of at least a portion of the plurality of data processing circuits, the state transitions of the parallel arithmetic device are temporarily halted when this halt condition is satisfied and various data are supplied as output from the parallel arithmetic device, whereby the parallel arithmetic device can be temporarily halted and various data can be checked when the desired halt condition is satisfied, and whereby the object code and/or source code of the parallel arithmetic device can be effectively debugged.

According to the fourth aspect of the present invention, a data processing system includes: a source input means for receiving the source code as input; object generation means for detecting operation states of a plurality of stages that undergo successive transitions based on the source code that has been received, and generating a series of object code that is composed of the operation commands for each of operating cycles that are successively switched of the plurality of data processing circuits and the plurality of interconnection switching circuits; a correspondence generation means for generating data that indicate the correspondence between the source code and the object code; an operation execution means for causing the parallel arithmetic device to execute the state transitions in accordance with the object code that has been generated; a halt input means for receiving as input a halt command for halt the parallel arithmetic device together with a halt condition that uses a specific portion of the source code; a device halt means for referring to data of the correspondence that have been generated and temporarily halting the state transitions of the parallel arithmetic device during the object code that satisfies the halt condition; and a result output means for supplying as output at least one part of held data, the interconnection relations, and the operation commands of the plurality of data processing circuits of the parallel arithmetic device that has been temporarily halted.

In this data processing system, the object code is generated from the source code, and further, data are generated that indicate the correspondence between the source code and object code. When the halt command is received as input together with the halt condition that employs a specific portion of the source code, the correspondence data are referred to, and in the event of object code that satisfies the halt condition, the state transitions of the parallel arithmetic device are temporarily halted and various data are supplied as output from the parallel arithmetic device. As a result, the parallel arithmetic device can be temporarily halted and various data can be checked when a desired halt condition is satisfied, and the source code of the parallel arithmetic device can therefore be effectively debugged.

According to the fifth aspect of the present invention, a data processing system includes: an operation execution means for causing the parallel arithmetic device to execute the state transitions in accordance with the object code; a halt input means for receiving as input a halt command for the parallel arithmetic device together with a halt condition; a halt generation means for generating object code that causes a portion of the plurality of data processing circuits and the interconnection switching circuits to function as a halt condition circuit that temporarily halts the state transitions in accordance with the halt condition that has been received as; a halt insertion means for inserting the object code of the halt condition circuit that has been generated into the operation description object code; and a result output means for supplying as output at least one part of held data, the interconnection relations, and the operation commands of the plurality of data processing circuits of the parallel arithmetic device that has been temporarily halted.

In the fifth data processing system of the present invention, when the halt command to halt the parallel arithmetic device is received together with a halt condition, the object code of the halt condition circuit that corresponds to the halt condition is generated and inserted into operation description object code, and various data of the temporarily halted parallel arithmetic device are supplied as output. As a result, the parallel arithmetic device can be temporarily halted under a desired halt condition and various data checked, whereby the object code and/or source code of the parallel arithmetic device can be effectively debugged.

Each of the various means described in the present invention may take any form that realizes its functions, and for example, can be realized by dedicated hardware that exhibits prescribed functions, by a data processing device that is given prescribed functions by means of a computer program, by prescribed functions that are realized in a data processing device by means of a computer program, or by a combination of these forms. In addition, each of the various means described in the present invention need not be realized independently, and as examples, a plurality of means may be integrated as a single part, a particular means may be part of another means, or a part of one particular means may be duplicated by a part of another means.

The above and other objects, features, and advantages of the present invention will become apparent from the following description with reference to the accompanying drawings, which illustrate examples of the present invention.

DETAILED DESCRIPTION OF THE PREFERRED EMBODIMENTS

Figure 1:
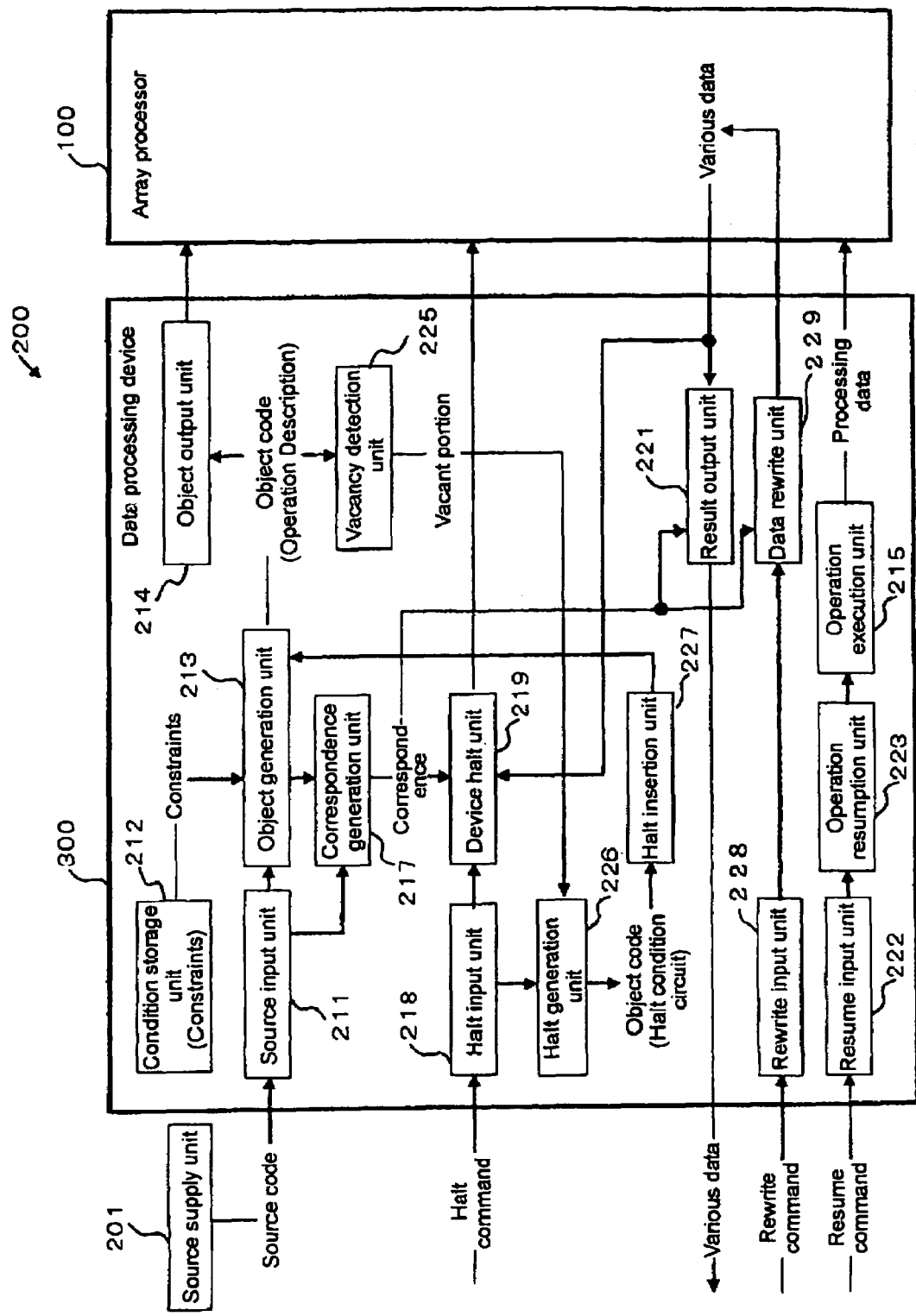
FIG. 1 is a block diagram showing a logical configuration of a data processing system according to an embodiment of the present invention.

Data processing system 200 according to an embodiment of the present invention that is shown in FIG. 1 includes: array processor 100, which is a parallel arithmetic device; data processing device 300 that supplies object code and data to array processor 100 and that acquires data from array processor 100; and source supply unit 201 that supplies source code to data processing device 300. Data processing device 300, when supplied with source code, converts the source code to object code of array processor 100 and supplies the object code to array processor 100; and further, has the function of controlling the operations of array processor 100. Data processing device 300 is further provided with the function of supporting the debugging of at least one of the source code and the object code of array processor 100. Before giving a detailed description of data processing device 300, array processor 100 will first be described.

Figure 2A:
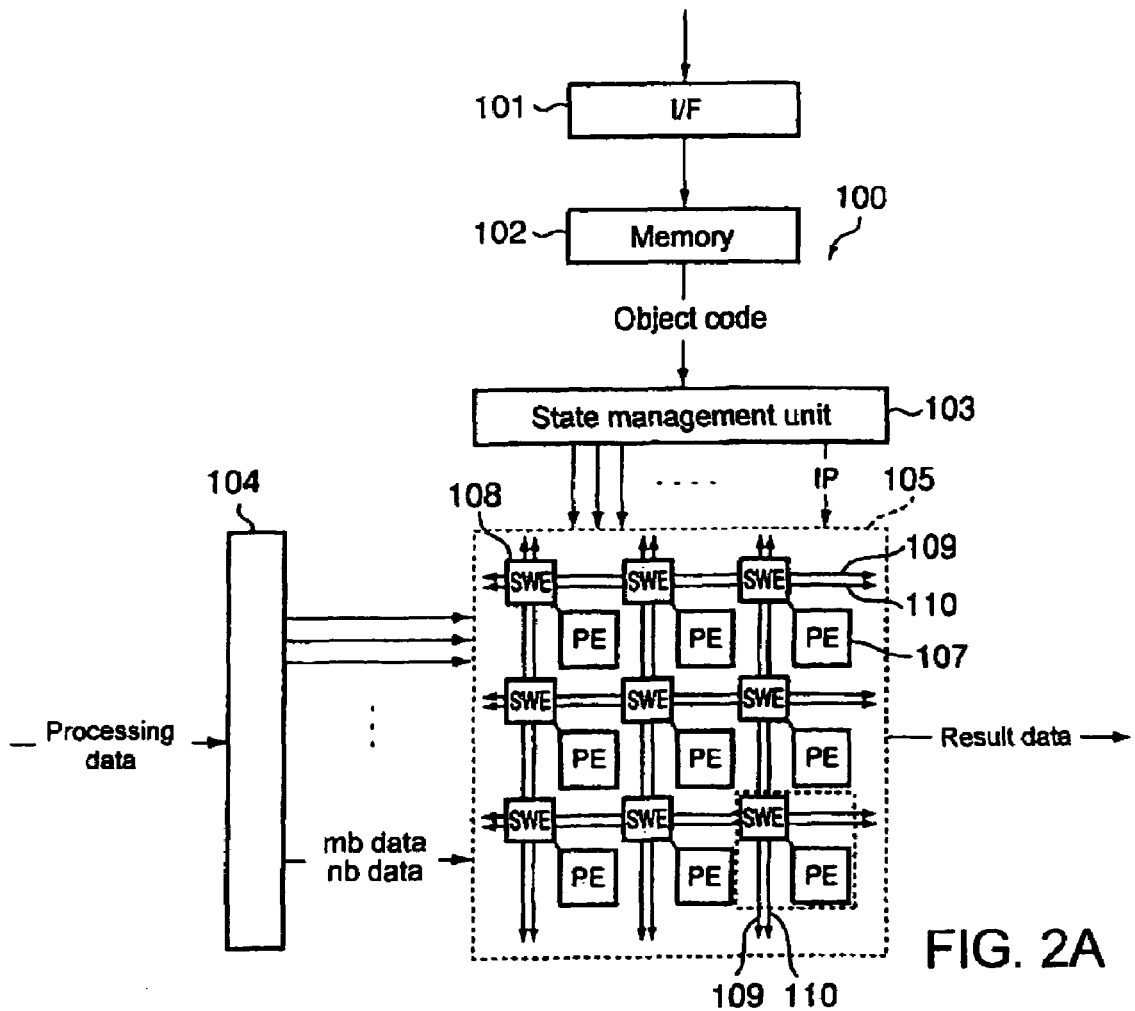
FIG. 2A is a block diagram showing the physical configuration of an array processor.

As shown in FIG. 2A, array processor 100, which is the parallel arithmetic device, is provided with matrix circuit unit 105 in which a multiplicity of data processing circuits of relatively small scale and interconnection switching circuits are arranged in a matrix form. In the following explanation, each of the data processing circuits is referred to as processor element (PE) 107, and each of the interconnection switching circuits is referred to as switch element (SWE) 108. In matrix circuit unit 105, a multiplicity of mb-buses 109 and a multiplicity of nb-buses 110 are provided in rows and columns, switch elements 108 are provided at each point of intersection of these buses, and each switch element 108 is connected to a single corresponding processor element 107. Here, mb-buses 109 transmit mb-data, which are processing data of 8 bits, i.e., one byte. Nb-buses 110 transmit nb-data, which are processing data of one bit. Operation commands can be individually set for each processor element 107, and processor elements 107 individually execute data processing in accordance with the operation commands that have been set. Operation commands can be individually set for each switch element 108, and switch elements 108 switch and control the connections of buses and processor elements 107 to be explained hereinbelow in accordance with the operation commands that have been set.

Array processor 100 further includes: I/F (Interface) unit 101 for receiving the object code as input; code memory 102 for storing the received object code; state management unit 103 for successively switching, for each operating cycle, the contexts that are composed of the operation commands of the plurality of processor elements 107 and the plurality of switch elements 108 in accordance with the object code stored in code memory 102; data distribution unit 104 for distributing input/output data to each bus; and data memory 106 (refer to FIG. 3).

Figure 2B:
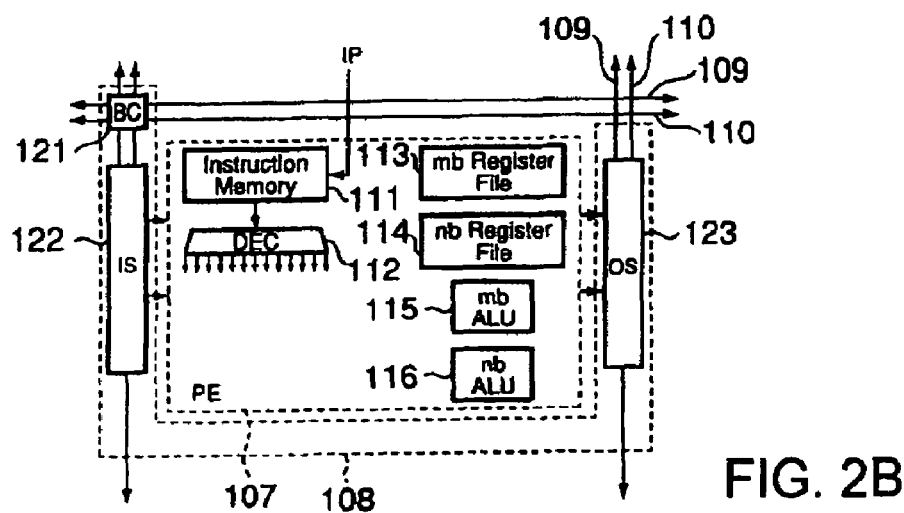
FIG. 2B is a block diagram showing the physical configuration of a processor element and a switch element in the array processor.

As shown in FIG. 2B, each processor element 107 includes: instruction memory 111 for storing operation commands; instruction decoder 112 for decoding operation commands; mb-register file 113 that corresponds to mb-data; nb-register file 114 that corresponds to nb-data; mb-ALU (arithmetic and logic-unit) 115, which is a unit for computing mb-data; nb-ALU 116, which is a unit for computing nb-ata; and internal wiring resources (not shown). Mb-register file 113 and mb-ALU 115 are mb circuit resources, and nb-register file 114 and nb-ALU 116 are nb circuit resources.

Each switch element 108 is provided with bus connector 121 for connecting switch element 108 to mb-buses 109 and nb-buses 110, and input control circuit 122 and output control circuit 123 for controlling input and output to processor element 107.

In array processor 100 of this configuration, data processing device 300 is connected to I/F unit 101, and a series of object code is applied as input from this data processing device 300. Code memory 102 is composed of an information storage medium such as a RAM (Random Access Memory) device, and stores the object code applied to I/F unit 101.

As will be explained in detail, this object code both describes the operation commands of the plurality of processor elements 107 and the plurality of switch elements 108 that are arranged in a matrix in matrix circuit unit 105 as contexts that are successively switched for each operating cycle, and describes the operation commands of state management unit 103 that switches these contexts with each operating cycle as operation states that undergo successive transitions.

State management unit 103 reads contexts for each operating cycle from the series of object code stored in code memory 102, and from these operation commands, generates instruction pointers (IP) of each processor element 107 and each switch element 108.

In the example that is here described, switch element 108 shares instruction memory 111 with the adjacent processor element 107, and state management unit 103 therefore supplies the set of instruction pointers generated for processor element 107 and switch element 108 to instruction memory 111 of the corresponding processor element 107.

The plurality of operation commands of processor element 107 and switch element 108 are stored in advance in instruction memory 111, and the operation commands that processor element 107 and switch element 108 are to execute are directed by two instruction pointers supplied from state management unit 103. Instruction decoder 112 decodes the operation commands designated by the instruction pointers and controls the operations of switch element 108, the internal wiring resources, mb-ALU 115, and nb-ALU 116.

Switch element 108 controls the connection relations between the plurality of processor elements 107 by means of mb-buses 109 and nb-buses 110 in accordance with the operation control of instruction decoder 112. More specifically, the plurality of mb-buses 109 and the plurality of nb-buses 110 extend in four directions, and bus connector 121 of switch element 108 controls the connection relations between mb-buses 109 and, and similarly, the connection relations between nb-buses 110.

By means of this configuration of array processor 100, state management unit 103 successively switches the contexts of matrix circuit unit 105 with each operating cycle in accordance with the object code that is set in code memory 102, and with each stage of these contexts, processor elements 107 each execute data processing in parallel operations in accordance with respective operation commands. In the interest of simplifying the explanation, an example of a configuration is shown in which buses, processor elements, and switch elements are arranged in a two-dimensional plane, but the above-described mb-buses 109, nb-buses 110, switch elements 108, and processor elements 107 may actually be formed to overlap each other in a stacked structure.

Input control circuit 122 controls the connection relations of data input from mb-buses 109 to mb-register file 113 and/or mb-ALU 115 and the connection relations of data input from nb-buses 110 to nb-register file 114 and/or nb-ALU 116; and output control circuit 123 controls the connection relations of data output from mb-register file 113 and/or mb-ALU 115 to mb-buses 109, and the connection relations of data output from nb-register file 114 and/or nb-ALU 116 to nb-buses 110.

Data distribution unit 104 divides the series of processing data supplied to array processor 100 from the outside between mb-data and nb-data, and then supplies this mb-data and nb-data to specific processor elements 107 from mb-buses 109 and nb-buses 110 for which connection relations are controlled by switch elements 108.

The internal wiring resources of these processor elements 107 control the connection relations of mb-register file 113 and mb-ALU 115 and the connection relations of nb-register file 114 and nb-ALU 116 in processor elements 107 in accordance with the operation control of instruction decoder 112. In accordance with the connection relations controlled by the internal wiring resources, mb-register file 113 temporarily holds mb-data that are received as input from, for example, mb-buses 109, and supplies the mb-data to, for example, mb-ALU 115. In accordance with the connection relations controlled by the internal wiring resources, nb-register file 114 temporarily holds nb-data that are received as input from, for example, nb-buses 110, and supplies the nb-data to, for example, nb-ALU 116. Mb-ALU 115 executes data processing relating to the mb-data in accordance with the operation control of instruction decoder 112, and nb-ALU 116 executes data processing relating to nb-data in accordance with the operation control of instruction decoder 112. By means of mb-register file 113 and nb-register file 114 that are incorporated as described above, processor elements 107 read and write mb-data and nb-data, respectively, and as necessary, read and write processing data from an outside data memory.

In actual practice, array processor 100 made up from the above-described configuration is assumed to operate in concert with typical CPUs, and the function to temporarily halt state transitions in response to the external input of a halt command is installed in state management unit 103, and further, array processor 100 is provided with read wiring such that, for example, data held in processor elements 107 can be read from the outside even in this type of temporarily halted state.

Figure 3:
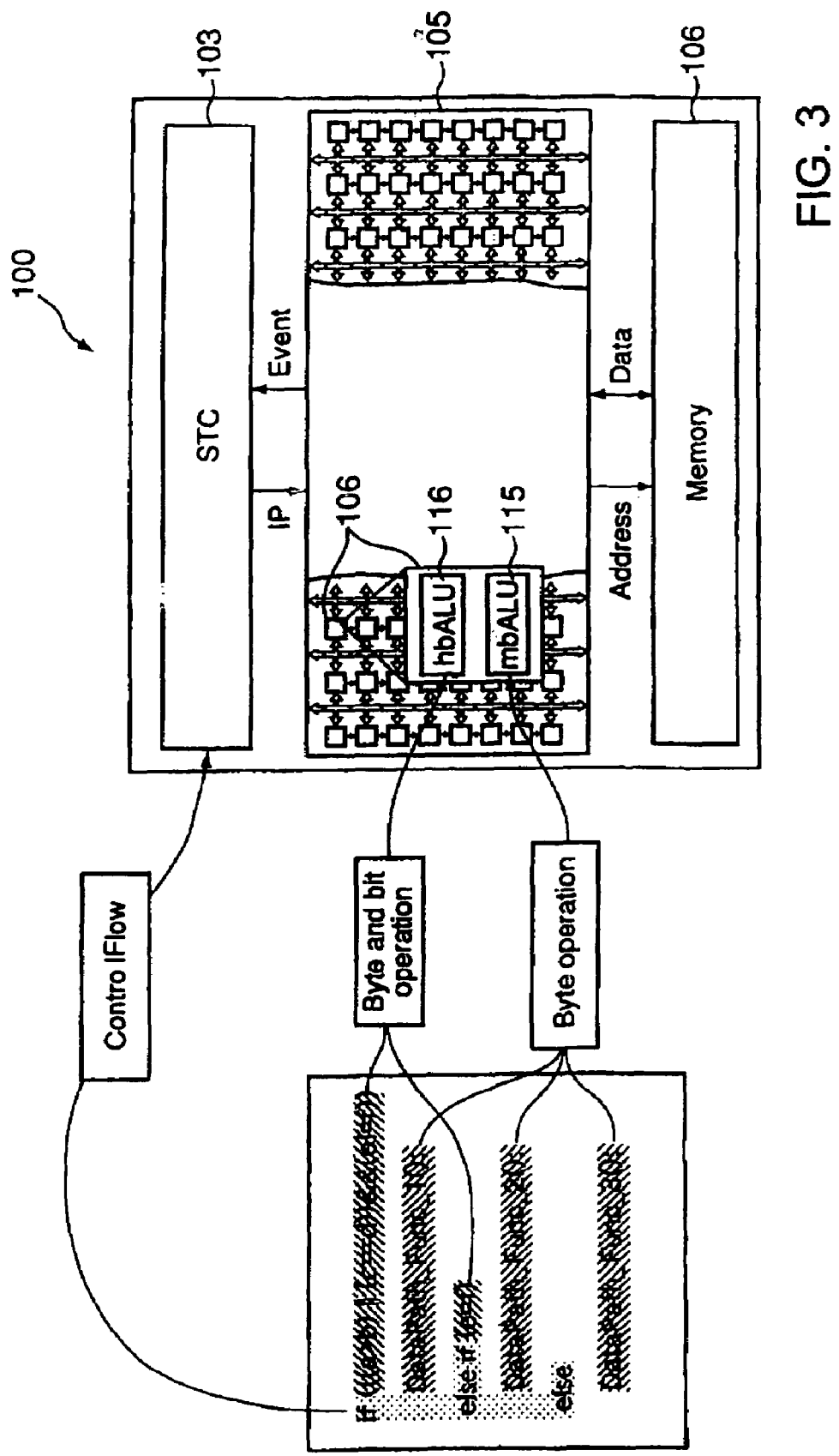
FIG. 3 is a schematic representation of the correspondence between the description content of source code and the hardware architecture of an array processor.

The relation between the described content of source code and hardware in the above-described array processor 100 is shown in FIG. 3.

In this array processor 100, logical processing circuits composed of a plurality of processor elements 107 and a plurality of switch elements are formed dynamically for each operating cycle in accordance with the contexts of the object code.

Returning to FIG. 1, explanation next regards data processing device 300. Data processing device 300 is provided with: source input unit 211, condition storage unit 212, object generation unit 213, object output unit 214, operation execution unit 215, correspondence generation unit 217, halt input unit 218, device halt unit 219, result output unit 221, resume input unit 222, operation resumption unit 223, vacancy detection unit 225, halt generation unit 226, halt insertion unit 227, rewrite input unit 228, and data rewrite unit 229.

As described hereinabove, data processing system 200 is provided with source supply unit 201 for supplying source code. This source supply unit 201 is composed of an FD (flexible disk) on which a series of source code is stored and supplies this source code to source input unit 211 of data processing device 300. The source code is composed of operation descriptions for causing the operation states of a plurality of stages of array processor 100 to successively make transitions for each operating cycle, and is described in a high-level language such as C language. This type of source code is composed of a plurality of lines that describe control configurations and operation expressions that include variables in various locations, and the operation states of array processor 100 that undergo successive transitions are reflected by a specific line number or numbers of the source code. In addition, various data are temporarily held in, for example, instruction memory 111, mb-register file 113, and nb-register file 114 of array processor 100, and in the source code, these held data are described as variables.

For example, the source code of the operation "y=x+123" is described by data such as the variables "x" and "y" that are the data held in, for example, register files 113 and 114, the constant "123" that is data held in, for example, register files 113 and 114, and a command for connecting these register files 113 and 114.

Various constraints that correspond to the physical configuration or physical characteristics of array processor 100 are registered in advance in condition storage unit 212.

From the source code applied as input to source input unit 211, object generation unit 213 detects operation states of a plurality of stages that undergo successive transitions based on the constraints of condition storage unit 212, and generates a series of object code that is composed of operation commands that are successively switched for each operating cycle for the plurality of processor elements 107 and the plurality of switch elements 108 of array processor 100. As previously described, state management unit 103 and matrix circuit unit 105 are separately formed in array processor 100, and object generation unit 213 therefore, when generating object code from the source code according to constraints reflecting this configuration, separates the data paths that correspond to matrix circuit unit 105 and the finite state machine that corresponds to state management unit 103 as shown in FIG. 3.

Object generation unit 213 generates object code from source code by means of various processes of multiple stages, and because object generation unit 213 refers, as appropriate, to necessary constraints from condition storage unit 212 in these processes of multiple stages, various constraints must be set, in condition storage unit 212, in the data content that are necessary and sufficient for the processing by object generation unit 213.

Object output unit 214 applies the series of object code that has been generated by object generation unit 213 as input to I/F unit 101 of array processor 100. As previously described, code memory 102 is connected to I/F unit 101 of array processor 100, and the object code is therefore held in code memory 102.

Operation execution unit 215, by generating a series of processing data and applying these data as input to data distribution unit 104 of array processor 100, causes array processor 100 to make state transitions in accordance with the object code.

Correspondence generation unit 217 generates data indicating the correspondence between the source code and the object code. The operation states of array processor 100 that undergo successive transitions as previously described are reflected by specific line numbers of the source code, and the data held by, for example, register files 113 and 114 of array processor 100 are described as variables in the source code. When converting the source code to the object code, correspondence generation unit 217 both generates data that indicate the correspondence between the line numbers of the source code and the operation states of array processor 100 and generates data that indicate the correspondence between the variables of the source code or the like and the data held by register files 113 and 114 of array processor 100.

Halt input unit 218 receives as input a halt command to array processor 100. The halt command is applied by this command alone, but may also be applied together with a halt condition that uses, for example, the line number of source code that corresponds to a specific operation state of array processor 100, a variable of source code that corresponds to specific held data of array processor 100, or a constant entered by input operations according to the user's wishes. For example, a halt condition that employs variables or constants may be applied as pattern data of a plurality of variables or constants that correspond to a held pattern of a plurality of items of held data of array processor 100, or as a condition formula of a plurality of variables or constants that correspond to a correlation of a plurality of items of held data of array processor 100.

Device halt unit 219 temporarily halts the state transitions of array processor 100 when the halt command has been received as input as described above, or when the halt condition has been met. To describe in greater detail, when a halt command is received together with the line number of source code that is a halt condition, device halt unit 219 refers to the correspondence between the source code and object code, and at the time of an operation state that corresponds to this line number, temporarily halts the state transitions of array processor 100. When the halt command is received together with, as the halt condition, pattern data of, for example, a plurality of variables of the source code, device halt unit 219 refers to the correspondence of the source code and the object code and temporarily halts the state transitions of array processor 100 at the time of held data of the held pattern of the halt condition. When the halt command is received together with a condition formula such as source code variables as the halt condition, device halt unit 219 refers to the correlation between the source code and object code and temporarily halts state transitions of array processor 100 at the time of held data in which the condition formula of the halt condition is satisfied.

Result output unit 221 not only acquires and supplies as output the held data, the connection relations, and the operation commands of each processor element 107 of temporarily halted array processor 100 as described above, but also refers to the correspondence between the source code and object code and supplies as output a portion of the source code that corresponds to the object code when array processor 100 has been temporarily stopped.

A command for resuming the state transitions is applied as input from the outside to resume input unit 222. Operation resumption unit 223, upon receiving the resume command, causes the resumption of state transitions of array processor 100.

When logical processing circuit 150 is formed by processor elements 107 and switch elements 108 in array processor 100 for each operating cycle in accordance with the object code of an operation description, vacancy detection unit 225 detects vacant portion 151 that is composed of processor elements 107 and switch elements 108 that are not used as logical processing circuit 150.

When a halt condition is received together with a halt command, halt generation unit 226 generates object code for causing a portion of the plurality of processor elements 107 and switch elements 108 to function as a halt condition circuit that temporarily halts the state transitions of array processor 100 in accordance with the received halt condition. To state in greater detail, when the haft command is received together with a halt condition that uses, for example, variables or line numbers of the source code, halt generation unit 226 refers to the correspondence between the source code and object code and, in accordance with the received halt condition, generates object code for causing processor elements 107 and switch elements 108 that exist in vacant portion 151 that has been detected in array processor 100 to function as a halt condition circuit.

Figure 4:
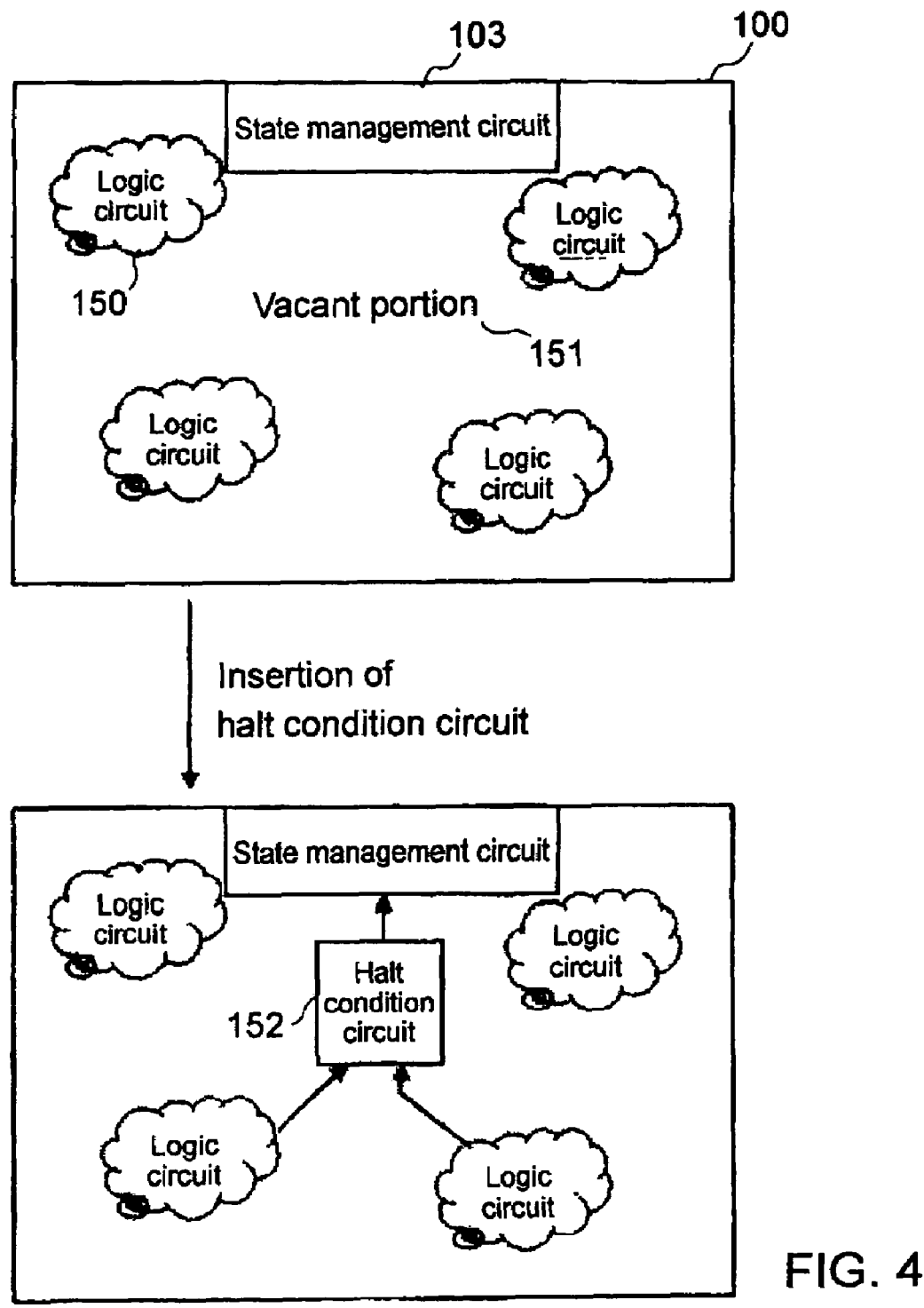
FIG. 4 is a schematic representation of insertion of a halt condition circuit into a vacant area of a matrix circuit unit.

Halt insertion unit 227, by inserting the generated object code of the halt condition circuit into operation description object code, inserts halt condition circuit 152 into vacant portion 151 in array processor 100 in which logical processing circuits 150 are arranged for each context as shown in FIG. 4. In addition, to insert halt condition circuit 152 into vacant portion 151 in this way, object generation unit 213 generates in advance the object code of logical processing circuits 150 such that vacant portion 151 will occur into which halt condition circuit 152 can be inserted.

Halt condition circuit 152 constructed in matrix circuit unit 105 of array processor 100 by means of the above-described object code, for example, monitors the data held in surrounding logical processing circuits 150, and when this held data matches with a prescribed condition received together with the halt command, reports this operation halt to state management unit 103 and thus temporarily halts state transitions by means of state management unit 103.

The data held in the plurality of mb-register files 113 and nb-register files 114 of temporarily halted array processor 100 are applied together with a rewrite command to rewrite input unit 228. Data rewrite unit 229 rewrites the corresponding data held in register files 113, 114 of temporarily halted array processor 100 with of the held data that are applied together with the rewrite command. When data held in array processor 100 are rewritten by this type of input operation to data processing device 300, and if for example variables of the source code are used to designate the held data, data processing device 300 refers to the correspondence between the source code and object code and rewrites the corresponding held data of array processor 100.

Figure 5:
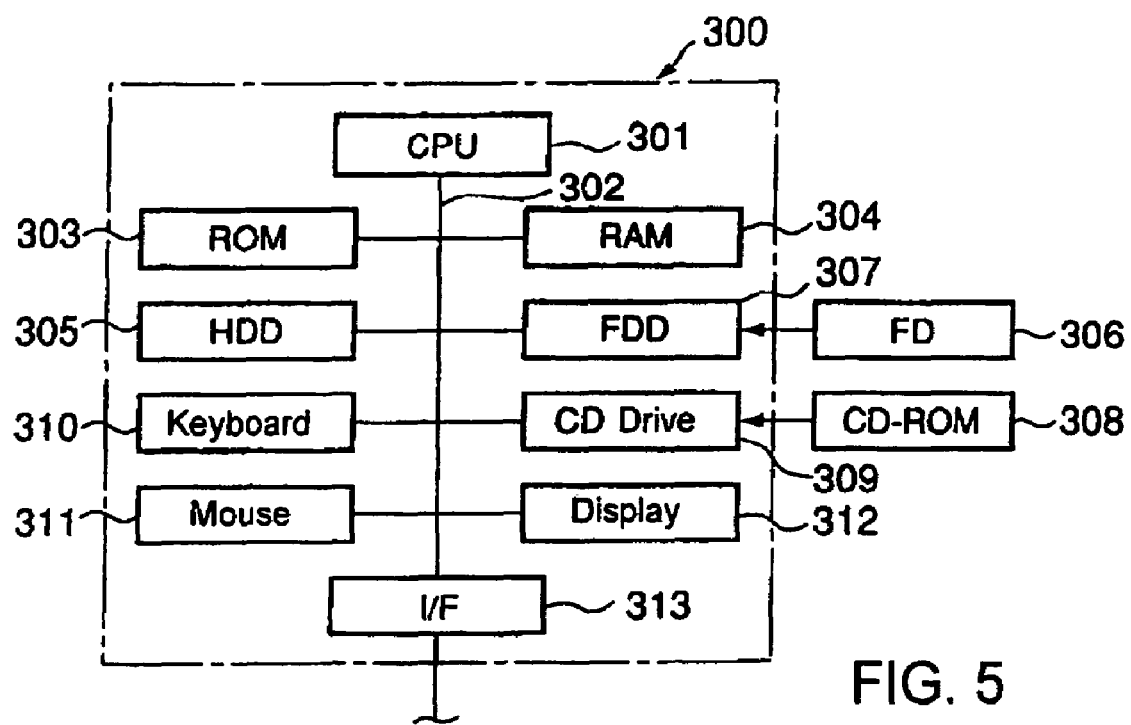
FIG. 5 is a block diagram showing the physical configuration of an example of hardware for realizing the data processing device shown in FIG. 1.

The above description regards the configuration of data processing device 300 in the present embodiment. Data processing device 300 may be formed as a dedicated hardware device, but can ordinarily be realized by a typical computer system that is controlled by software. As shown in FIG. 5, data processing device 300 that is realized through software control includes CPU 301 as the hardware constituting the main unit of a computer, and CPU 301 is in turn connected by means of bus line 302 to, for example, ROM (Read Only Memory) 303, RAM 304, HDD (Hard Disk Drive) 305, FDD (FD drive) 307 into which FD 306 can be exchangeably mounted, CD-ROM (Compact Disk-ROM) drive 309 into which CD-ROM 308 can be exchangeably mounted, keyboard 310, mouse 311, display 312, and I/F unit 313. In data processing device 300 realized by this type of general-use computer system, hardware such as ROM 303, RAM 304, HDD 305, FD 306, and CD-ROM 308 corresponds to information storage media, and a computer program and various data for CPU 301 are stored as software in at least one of these media.

For example, a computer program for causing CPU 301 to execute various types of data processing is stored in advance in FD 306 or CAROM 308. This type of software has been installed into HDD 305 in advance, and when the computer system (data processing device) 300 is started up, the software is copied to RAM 304 and then read by CPU 301.

CPU 301 thus reads an appropriate computer program and executes various types of data processing, whereby the computer system logically includes each of the function blocks such as source input unit 211, condition storage unit 212, object generation unit 213, object output unit 214, operation execution unit 215, correspondence generation unit 217, halt input unit 218, device halt unit 219, result output unit 221, resume input unit 222, operation resumption unit 223, vacancy detection unit 225, halt generation unit 226, halt insertion unit 227, rewrite input unit 228, and data rewrite unit 229, as shown in FIG. 1.

More specifically, source input unit 211 corresponds to, for example, the functions by which CPU 301 controls the operations of FDD 307 in accordance with a computer program that is stored in RAM 304. Condition storage unit 212 corresponds to storage areas of HDD 305 that CPU 301 recognizes in accordance with the above-described computer program.

All of object generation unit 213, operation execution unit 215, correspondence generation unit 217, device halt unit 219, operation resumption unit 223, vacancy detection unit 225, halt generation unit 226, halt insertion unit 227, and data rewrite unit 229 correspond to functions by which CPU 301 executes prescribed data processing in accordance with the computer program.

Object output unit 214 corresponds to the functions by which CPU 301 controls the data output of I/F unit 313 in accordance with the computer program. Each of halt input unit 218, resume input unit 222 and rewrite input unit 228 corresponds to, for example, the functions by which CPU 301 detects manual operations at keyboard 310. Result output unit 221 corresponds to, for example, the functions by which CPU 301 causes display output of prescribed data on display 312.

Each of the function blocks of data processing device 300 is thus realized by using hardware such as FDD 307 or I/F unit 313 as necessary, but the preponderance of functional blocks are realized by the functioning of CPU 301, i.e., the hardware of data processing device 300, in accordance with software stored in an information storage medium such as RAM 304.

This type of software is stored on an information storage medium such as RAM 304 as a computer program for causing CPU 301 to execute data processing such as processes for;

storing in, for example, HDD 305 various types of constraints that correspond to, for example, the physical configuration or physical characteristics of array processor 100;

receiving input of source code that describes operations of array processor 100 by, for example, causing FDD 107 to read data stored in FD 306;

generating object code of array processor 100 from the received source code in accordance with the constraints;

supplying the generated object code from, for example, I/F unit 313;

generating a series of processing data and applying the generated processing data as input to data distribution unit 104 of array processor 100 to thus cause array processor 100 to execute state transitions in accordance with the object code;

generating data that indicate the correspondence between the source code and object code;

accepting as input a halt command for array processor 100 to, for example, keyboard 310;

temporarily halting the state transitions of array processor 100 when a halt command has been received;

when a halt command is received together with halt conditions that employ the line numbers of source code, referring to the correspondence between the source code and object code and temporarily halting the state transitions of array processor 100 at the time of an operation state that corresponds to these line numbers;

when a halt command is received together with a halt condition that employs, for example, source code variables, referring to the correspondence between the source code and object code, and temporarily halting the state transitions of array processor 100 at the time of held data that meet these halt conditions;

detecting vacant portion 151 within array processor 100 that is not used as logical processing circuit 150;

generating object code for causing processor elements 107 and switch elements 108 that are present in detected vacant portions 151 to function as halt condition circuit 152 for temporarily halting array processor 100 by means of the received halt condition;

inserting the generated object code of halt condition circuit 152 into operation description object code;

retrieving and supplying as output, for example, the held data, the connection relations, or the operation commands of a plurality of processor elements 107 in temporarily halted array processor 100, and further, referring to the correspondence between the source code and object code and supplying as output a portion of the source code that corresponds to object code when array processor 100 has been temporarily halted;

receiving input of a resume command to, for example, keyboard 310;

causing array processor 100 to resume the state transitions when the resume command has been received;

accepting the input of a rewrite command and data held by, for example, the plurality of mb-register files 113 and nb-register files 114 of array processor 100 that has been temporarily halted; and rewriting the data held in, for example, corresponding register files 113 and 114 of temporarily halted array processor 100 with the held data received together with the rewrite command.

Explanation next regards the operations of data processing system 200 of the present embodiment.

In data processing system 200 of the above-described configuration, when source code describing operations of array processor 100 is supplied to data processing device 300 from source supply unit 201, data processing device 300 converts the source code to object code and supplies the object code to array processor 100.

In array processor 100, state management unit 103 holds the received object code and generates instruction pointers for each processor element 107, and by means of these instruction pointers, one operation command from among the plurality of operation commands stored in instruction memory 111 is designated for each processor element 107. Designated operation commands are decoded by instruction decoder 112, and by means of the decoded operation commands, the connection relations of the plurality of processor elements 107 are controlled by switch elements 108, the connection relations within processor elements 107 by the internal wiring resources are controlled, and the data processing of ALUs 115 and 116 is controlled, whereby array processor 100 attains the state of hardware that executes data processing in accordance with the object code.

In this state, the series of processing data that is applied to array processor 100 from operation execution unit 215 is divided between mb-data and nb-data at data distribution unit 104, and the processing data are then processed in mb-ALUs 115 and nb-ALUs 116 in each of the plurality of processor elements 107 in which connection relations and data processing are controlled as described above.

When array processor 100 makes state transitions in accordance with object code in this data processing system 200, the application of a halt command of array processor 100 to data processing device 300 causes a temporary halt of the state transitions of array processor 100 in accordance with this halt command. To state in greater detail, when converting the source code to the object code, data processing device 300 also generates data that indicate the correspondence between the line numbers of the source code and the operation states of array processor 100, and data that indicate the correspondence between source code variables and data held in mb-register files 113 and nb-register files 113 of array processor 100.

When array processor 100 is making state transitions in accordance with the installed object code and processing data supplied from data processing device 300, data processing device 300, upon receiving the halt command together with the halt condition that uses source code line number that correspond to a specific operation state of array processor 100, refers to the correspondence between the source code and the object code, and temporarily halts the state transitions of array processor 100 at the time of an operation state that corresponds to a line number that has been received. In this case, data processing device 300 communicates with state management unit 103 of array processor 100 in real time and monitors the operation states, and applies the halt command to state management unit 103 upon a transition to the specific operation state. As previously described, array processor 100 is implemented in advance with the temporary halt function, and state management unit 103 that has received the halt command causes the temporary halt of the state transition that is being executed.

In this state, data processing device 300 reads, for example, the held data, the connection relations, and the operation commands in the plurality of processor elements 107 from temporarily halted array processor 100, and then not only displays by means of display 312 and supplies the output from data processing device 300, but also displays and supplies the source code that corresponds to the temporarily halted operation state. The user can therefore check the various data that are displayed and supplied and thus debug the source code.

In addition, when the user that has checked the various data of temporarily halted array processor 100 that uses, for example, keyboard 310 to apply as input a command to resume state transitions to data processing device 300, data processing device 300 releases the temporary halt of state management unit 103 of array processor 100 and resumes the supply of processing data, whereby the state transitions of array processor 100 are resumed.

The user, by performing input operations to keyboard 310 of data processing device 300, can rewrite data held in each of the register files 113, 114 of temporarily halted array processor 100. As a result, data held in array processor 100 can be temporarily modified and operations can be verified, and this capability can be used in debugging the source code.

When array processor 100 is executing state transitions and a halt command is applied to data processing device 300 together with a halt condition that uses, for example, source code variables, data processing device 300 refers to the correspondence between source code and object code and temporarily halts the state transitions of array processor 100 at the time of held data in which the halt condition is satisfied. In such a case, data processing device 300 monitors the held data of the plurality of processor elements 107 of array processor 100 in which operation states are undergoing successive transitions, and applies the halt command to state management unit 103 when this held data corresponds to a data pattern or condition formula. In this state, data processing device 300 reads various data from temporarily halted array processor 100 and displays on display 312 and supplies output of this data together with the source code, whereby the user is able to debug the source code of array processor 100. In this case as well, the user is able to rewrite data held in, for example, each of register files 113, 114 of temporarily halted array processor 100 and can therefore use this capability to debug the source code.

In data processing system 200 of the present embodiment, data processing device 300 is not only able to temporarily halt the state transitions of array processor 100 in real time, but can actively cause array processor 100 to execute a temporary halt. In such a case, when a halt command is applied as input to data processing device 300 together with a halt condition that uses, for example, line numbers or variables of the source code, data processing device 300 refers to the correspondence between source code and object code, generates object code of halt condition circuit 152 that temporarily halts the state transitions of array processor 100 in accordance with this halt condition, and inserts this generated object code into the operation description object code.

Data processing device 300, when generating object code from operation description source code, generates object code of logical processing circuits 150 in advance such that vacant portion 151 occurs in which halt condition circuit 152 can be inserted, as shown in FIG. 4. Data processing device 300 then detects vacant portion 151 in array processor 100 in which logical processing circuits 150 are not constructed by means of operation description object code and inserts object code of halt condition circuit 152 in the operation description object code such that halt condition circuit 152 is arranged in this vacant portion 151.

Data processing device 300 thus supplies operation description object code in which object code of halt condition circuit 152 has been inserted to array processor 100, and this array processor 100 therefore executes state transitions by operation description object code in which the object code of halt condition circuit 152 has been inserted. Halt condition circuit 152 consequently constructed in array processor 100 monitors the operation states of logical processing circuits 150 constructed in surrounding areas and supplies a halt command to state management unit 103 when the halt condition is satisfied, whereby array processor 100 temporarily halts automatically in an operation state that corresponds to the halt condition.

In this type of state, data processing device 300 reads various data from temporarily halted array processor 100, displays and supplies output of these data on display 312 together with the source code, whereby the user is able to debug the source code of array processor 100. In this case as well, the user is of course able to rewrite data held in each of register files 113, 114 of temporarily halted array processor 100 and can therefore use this capability to debug the source code.

Figure 6:
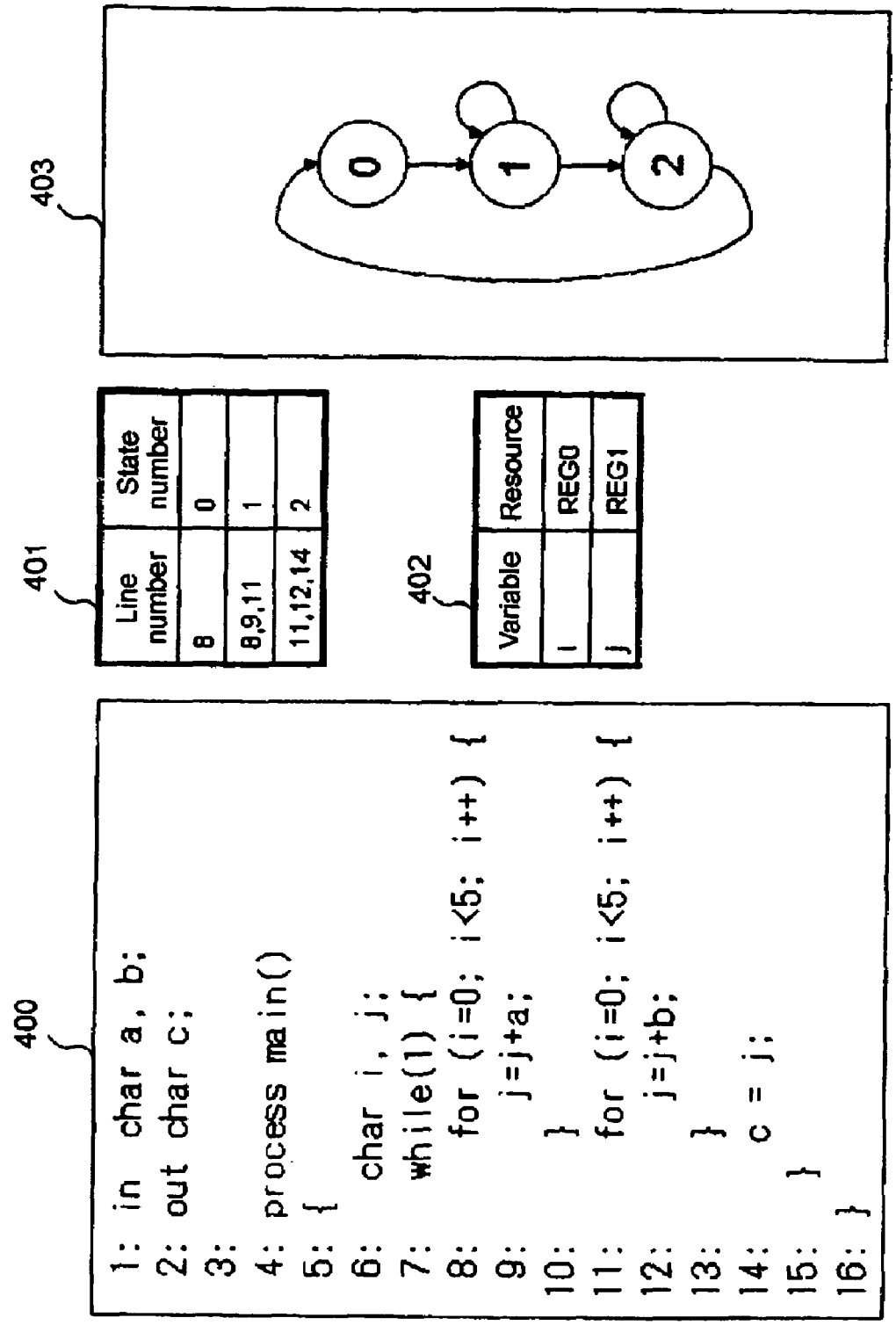
FIG. 6 shows the relations among a source program, a state transition after combination, a line number correspondence table, and a variable correspondence table.

Explanation, next regards an actual example of setting halt conditions with reference to FIG. 6. FIG. 6 shows the relations among a source program, state transitions after combination, a line number correspondence table, and a variable correspondence table. It is here assumed that the user applies halt conditions as input in a state in which source program 400 is combined in hardware such as array processor 100 having state transitions 403, and further, in which line correspondence table 401 and variable correspondence table 402 are supplied as output from data processing device 300.

In source program 400 shown in this example, variables a and b correspond to input ports, variable c corresponds to an output port, and variables i and j are local variables in function "main." By means of line correspondence table 401 supplied by data processing device 300, the user can recognize that state 0 is a state combined from line number 8, and similarly, can recognize that state 1 is combined from line numbers 8, 9, and 11 and that state 2 is combined from line numbers 11, 12, and 14. In addition, the user can recognize that variable i is realized by register REG0 of, for example, mb-register file 113 of array processor 100, and that variable j is realized by register REG1 of, for example, nb-register file 114.

For example, when the user applies line number 9 of the source program together with a halt command to data processing device 300, data processing device 300 recognizes from the line correspondence table that state number 1 corresponds to this line number, and halts array processor 100 at the time of state number 1. This is equivalent to directly designating state number 1 together with a halt command.

When a condition formula in which the line number of the source program is 9 and j≧100 is applied as input together with a halt command, data processing device 300 recognizes from the line correspondence table that state number 1 is the corresponding state and recognizes from the variable correspondence table that variable j corresponds to REG1. Data processing device 300 then generates halt condition circuit 152 that supplies a halt signal when the state number becomes 1 and the content of REG1 is equal to or greater than 100, detects vacant portion 151 of array processor 100, and writes generated haft condition circuit 152 in this vacant portion 151. When array processor 100 is operating in this state and the content of REG0 attains or exceeds 100 when the state number is 1, halt condition circuit 152 reports a halt signal to state management unit 103, and state management unit 103 halts the operation of array processor 100.

It is further possible to set a plurality of halt commands or halt conditions. For example, when input is performed for a condition formula in which, in addition to the above-described halt condition, line number 12 of the source code, and moreover, j>200, data processing device 300 halts array processor 100 when J equals or exceeds 100 in the first loop and when j is greater than 200 in the second loop. In addition, the halt conditions that have been set in data processing device 300 can also be released by means of desired operations of the user.

When the halt command of array processor 100 is applied together with a specific operation state, data processing device 300 temporarily halts the state transitions of array processor 100 during this operation state and causes the output of various data. Therefore, the use of data processing device 300 allows the temporary halt of array processor 100 and the checking of various data in a desired operation state, whereby the user can effectively debug the object code and source code of array processor 100.

When a halt command of array processor 100 is received together with a halt condition that uses the held data of specific processor elements 107, data processing device 300 temporarily halts the state transitions of array processor 100 and causes the output of various data when the held data satisfy this halt condition. Thus, the use of data processing device 300 allows temporary halting of array processor 100 and checking of various data when a desired halt condition is satisfied, whereby the user can effectively debug the object code and source code of array processor 100.

Data processing device 300 of the present embodiment, in addition to monitoring the operation state and held data of array processor 100 in real time and temporarily halting state transitions, is able to generate object code of halt condition circuit 152 that corresponds to the operation state and held data and insert this object code into operation description object code. Data processing device 300 therefore allows the state transitions of array processor 100 to be actively halted when a desired halt condition is satisfied, and therefore enables the user to effectively debug the object code and source code of array processor 100.

Data processing device 300 not only generates object code from the source code of array processor 100, but also generates data that show the correspondence between this source code and object code. Thus, if a halt condition that employs the above-described operation state and held data is applied to data processing device 300 as a halt condition that employs, for example, variables or line numbers of the source code, data processing device 300 refers to the correspondence and can automatically temporarily halt array processor 100 at an appropriate time. Accordingly, the user need only apply a halt condition that uses the source to data processing device 300 and can therefore dispense with the inconvenience of checking the object code that corresponds to the source code and creating a halt condition, and the source code can therefore be effectively debugged by a simple procedure. Moreover, the user need only check the source code supplied as output by data processing device 300 and can dispense with the inconvenient task of checking the source code based on the object code supplied as output, and the source code can therefore by effectively debugged by a simple procedure.

When a rewrite command is supplied together with data to data processing device 300 with array processor 100 in a temporarily halted state. the held data of mb-register file 113 and nb-register file 114 of array processor 100 can be rewritten by this data input, and this data rewrite can be used in the verification of the operations of array processor 100 and the debugging of the source code. In a case in which the held data of array processor 100 are rewritten by means of this type of input operation to data processing device 300, the use of, for example, source code variables to designate the held data enables data processing device 300 to refer to the correspondence between source code and object code and rewrite the corresponding held data of array processor 100, whereby the troublesome task of checking the object code that corresponds to the source code and carrying out input operations for held data can be eliminated.

When a command to resume state transitions is applied as to data processing device 300 with array processor 100 in a temporarily halted state, data processing device 300 causes the resumption of the state transitions of array processor 100, whereby the debugging of a series of the source code can be easily continued.

In addition, when inserting object code of halt condition circuit 152 into operation description object code, data processing device 300 of the present embodiment detects vacant portion 151 in which logical processing circuits 150 have not been constructed by means of operation description object code and inserts object code of halt condition circuit 152 into the operation description object code such that halt condition circuit 152 is arranged in vacant portion 151, whereby halt condition circuit 152 can be effectively constructed in array processor 100. When generating object code from the operation description source code, data processing device 300 generates the operation description object code such that vacant portion 151 is generated in which halt condition circuit 152 can be inserted, and halt condition circuit 152 can therefore be effectively constructed in array processor 100.

The present invention is not limited to the above-described embodiment and permits various modifications. For example, although an example was presented in which data processing device 300 and array processor 100 were provided as separate hardware components that were connected by wiring, data processing device 300 and array processor 100 can also be formed as a single hardware unit.

Further, although an example was described in which data processing system 200 was composed of actual data processing device 300 and actual array processor 100, a virtual array processor may also be constructed in data processing device 300 by means of an emulation program. In such a case, after debugging the source code by using the virtual array processor, the source code must be actually verified using actual array processor 100, but, for example, the source code of array processor 100 can be debugged by the emulation program in advance when the actual production or supply of array processor 100 is delayed.

Although an example was described in the present embodiment in which a compiler function for converting source code to object code and a debugging function for debugging the source code and/or the object code are implemented as a unit in data processing device 300, these functions can also be implemented in separate hardware or software. In such a case, the compiler must generate data of the correspondence between source code and object code and supply these data to the debugger, and the debugger must request the compiler for the generation and insertion of object code of halt condition circuit 152. As a result, the hardware and software of the compiler and debugger ideally communicate in real time and operate in concert. In such a case, moreover, it is also possible for the debugger to independently generate the object code of halt condition circuit 152 and then insert the object code of halt condition circuit 152 into the operation description object code that has been generated by the compiler.

The above-described embodiment described only a case in which the functions of the compiler and debugger are implemented in data processing device 300 and in which the conversion of the source code of array processor 100 to object code is realized by means of a compiler function. However, it is also possible, for example, to set a debugging mode and an executing mode as switchable operation modes in the functions of the compiler, and then to generate object code that is appropriate for debugging and another object foce that is appropriate for executing the target data processing. For example, when generating operation description object code such that vacant portion 151 occurs for debugging as previously described, vacant portion 151 has no role in the object code for actual executing. However, by making the debugging mode and executing mode selectable in the compiler function as described above, it is possible to cause vacant portion 151 to occur in the debugging mode but not occur in the executing mode. It is further possible to form this type of compiler for debugging and compiler for actual executing as separate software or hardware components, and to then use one during debugging and the other during actual executing.

Although a case was used in the above-described embodiment in which array processor 100 is temporarily halted at desired times, it is also possible, for example, to temporarily halt, for each operating cycle, the state transitions of array processor 100 that corresponds to object code and cause the output of various data, and then cause the resumption of state transitions of array processor 100 upon the input of a command to resume state transitions. In this case, the various data and states of array processor 100 that makes state transitions in accordance with the object code can be successively checked, and with each temporary halt, the held data of array processor 100 can be rewritten. The temporary halts of array processor 100 can be quickly released, and the object code and source code of array processor 100 can therefore be effectively debugged.

Although a case was described in the above-described embodiment in which object code was generated beforehand to cause the occurrence of vacant portion 151 for constructing halt condition circuit 152 in array processor 100, it is also possible, for example, to generate object code such that vacant portion 151 does not occur, and then, when the, insertion of halt condition circuit 152 becomes necessary, to alter the arrangement of logical processing circuits 150 and then generate vacant portion 151.

Although a case was described in which the object code of halt condition circuit 152 is inserted in operation description object code and array processor 100 then caused to operate by a series of object code, it is also possible to insert the object code of halt condition circuit 152 in the operation description object code with array processor 100 in a temporarily halted state. In such a case, halt condition circuit 152 can be added in array processor 100 in which state transitions have been temporarily halted, whereby a halt condition can be dynamically inserted in array processor 100.

Although an example was presented in the above-described embodiment in which there is a one-to-one correspondence between operation states having a plurality of stages managed by state management unit 103 and contexts successively switched for each operating cycle at matrix circuit unit 105, as disclosed by the assignee of the present invention in JP P2003-99409A, it is also possible to detect, from operation states of a plurality of stages, a plurality of operation states that can be assigned to a single context by means of constraints, and to assign this plurality of operation states that have been detected to a single context, and it is further possible to assign a plurality of discontinuous operation states to a single context. In this case, the number of contexts that are set in object code can be reduced, thereby allowing an economization of the storage capacity of code memory 102 that temporarily holds the object code of array processor 100.

Figure 7:
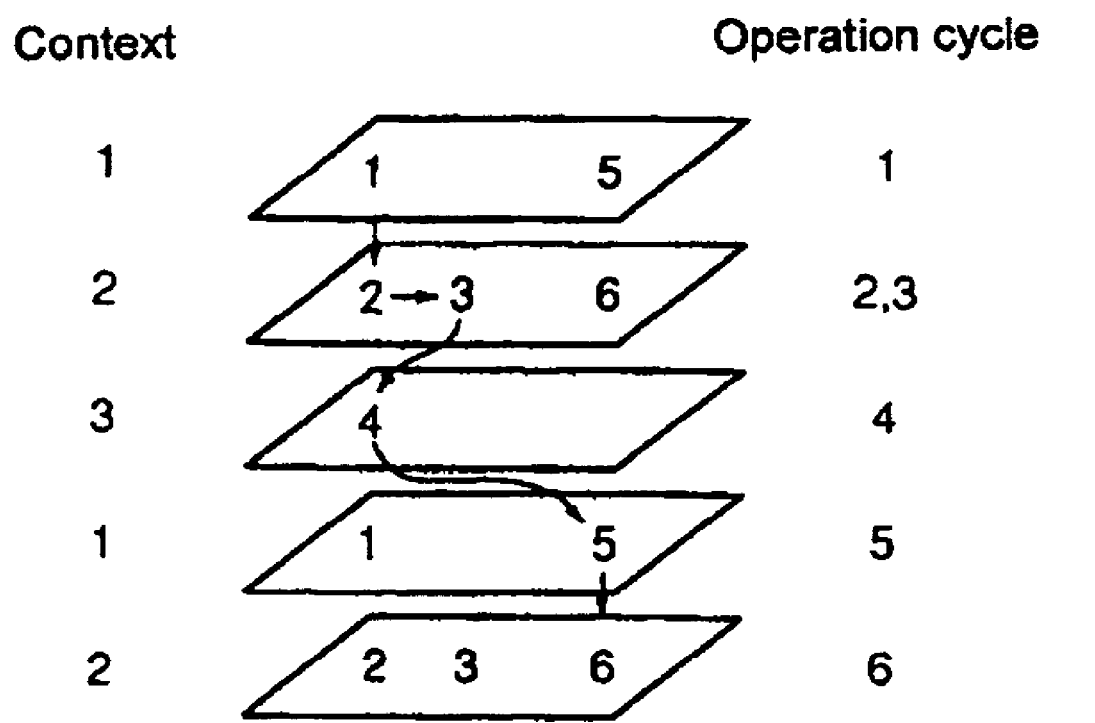
FIG. 7 is a schematic representation of the assignment of a plurality of discontinuous operation states to a single context.

For example, when a first and fifth operation states are assigned to a first context; a second, third, and sixth operation states are assigned to a second context; and a fourth operation state is assigned to a third context as shown in FIG. 7, data processing of the first operation state of the first context is executed in a first operating cycle in array processor 100 that operates in accordance with this object code. At this time, logical processing circuits 150 of the fifth operation state are constructed, but these logical processing circuits 150 of the fifth operation state, although used in the fifth operating cycle, are not used in the first operating cycle. In other words, the position at which logical processing circuits 150 of the fifth operation state are constructed is recognized as vacant portion 151 in the first operating cycle, and halt condition circuit 152 can therefore be formed at this position. It is further possible to detect, in the area in which used logical processing circuits 150 are constructed, logical processing circuits that are subsequently not used and to then replace the unused logical processing circuits by halt condition circuit 152 with this area as vacant portion 151.

Although array processor 100 in which matrix circuit unit 105 and state management unit 103 are divided is adopted as the parallel arithmetic device in the above-described embodiment, it is also possible to use an FPGA (Field Programmable Gate Array) or a PLD (Programmable Logic Device) as the parallel arithmetic device in which these components are not separated. However, currently available FPGA and PLD are not installed with the capability for temporarily halting operations, and when temporarily halting an FPGA to debug source code and object code, it is preferable to halt the clock signals or construct a temporary halt capability as logical processing circuit 150 in the FPGA by means of object code.

Although a case was described in the above-described embodiment in which array processor 100 makes successive transitions of operation states of a plurality of stages as state transitions, it is also possible for a single operation state to be repeated as the particular solution of these state transitions. In such a case, data processing device 300 temporarily halts a single operation state that is repeated at any timing, and it is therefore possible to debug the source code of that operation state.

Although a case was described in the above-described embodiment in which source code variables or constants were realized as the held data of register files 113, 114, it is also possible, for example, to convert these variables or constants to object code that describes using various types of hardware such as registers, wires, ports, and memory.

In the above-described embodiment, a case was described in which halt input unit 218 accepts the input of halt commands and halt conditions, halt generation unit 226 generates the object code of haft condition circuit 152, and halt insertion unit 227 inserts the object code of halt condition circuit 152 into operation description object code. However, it is also possible for halt input unit 218 to accept the input of a halt command and prescribed data that is not a halt condition, for halt generation unit 226 to generate object code of a function-adding circuit that adds a prescribed function to array processor 100 in accordance with prescribed data, and for halt insertion unit 227 to insert object code of a function-adding circuit into the operation description object code. In such a case, a prescribed function can be added to array processor 100 that is temporarily halted, whereby a more effective debugging operation can be executed.

Although a case was taken in the above-described embodiment in which variable were used as a specific portion of source code that is used in the input of a halt condition, it is also possible for the description part of a source program that corresponds to, for example, a register, a wire, a port, or memory to be used as this specific portion of source code, or a description part of an arrangement, structure, or shared entity that treats these parts as an assemblage may be used as this specific portion of source code.

Although a case was described in the above-described embodiment in which, as a halt condition, a condition formula was applied as input to data processing device 300, it is also possible for this type of condition formula to be composed of a NOT, OR, AND, or exclusive OR of one or more condition formulas. Further, although a case was described in the above-described embodiment in which array processor 100 is halted when one condition formula is satisfied, it is also possible for array processor 100 to be halted when a plurality of conditions is satisfied.

Finally, a case was described in the above-described embodiment in which various function blocks were logically realized as the various functions of data processing device 300 by the operation of CPU 301 in accordance with a computer program that is stored in, for example, RAM 304. However, it is also possible to form each of these function blocks as an individual unit of hardware, or to form a portion of these function blocks as software and store in RAM 304 and to form a portion as hardware.

While preferred embodiments of the present invention have been described using specific terms, such description is for illustrative purposes only, and it is to be understood that changes and variations may be made without departing from the spirit or scope of the following claims.

What is claimed is:

1. A data processing system for debugging at least one of operation description source code and object code that cause, for each operating cycle, successive transitions of operation states of a plurality of stages of a parallel arithmetic device, said parallel arithmetic device comprising a plurality of data processing circuits for individually executing modifiable data processing and a plurality of interconnection switching circuits for switch-controlling interconnection relations of said plurality of data processing circuits, said plurality of data processing circuits and said plurality of interconnection switching circuits being arranged in a matrix, and said parallel arithmetic device having a function to temporarily halt said state transitions; said data processing system comprising:

an operation execution means for causing said parallel arithmetic device to execute said state transitions in accordance with said object code;

a device halt means for temporarily halting said state transitions for each of said operating cycle of said parallel arithmetic device;

a result output means for supplying as output at least one portion of held data, said interconnection relations, and operation commands of said plurality of data processing circuits of said parallel arithmetic device that has been temporarily halted;

a resume input means for supplying as input a command to resume said state transitions; and an operation resumption means for causing said operation execution means to resume said state transitions upon the input of said resume command.

2. The data processing system according to claim 1, further comprising:

source input means for receiving said source code as input;

object generation means for detecting, from said source code that has been received, operation states of a plurality of stages that undergo successive transitions, and for generating a series of object code that is composed of said operation commands for each of successively switching operating cycles of said plurality of data processing circuits and said plurality of interconnection switching circuits; and a correspondence generation means for generating data that indicate correspondence between said source code and said object code;

wherein said result output means refers to data of said correspondence that has been generated and supplies as output a portion of said source code that corresponds to said object code when said parallel arithmetic device is temporarily halted.

3. The system according to claim 1, wherein:

said parallel arithmetic device separately includes:

a matrix circuit unit in which said plurality of data processing circuits and said plurality of interconnection switching circuits are arranged in a matrix; and a state management unit for successively switching, for each operating cycle, operation commands of said matrix circuit unit;

said plurality of data processing circuits individually execute said data processing in accordance with operation commands that are individually set; and said plurality of interconnection switching circuits individually switch-control the interconnection relations of said plurality of data processing circuits in accordance with operation commands that are individually set.

4. The system according to claim 1, further comprising:

rewrite input means for receiving as input held data of at least one portion of said plurality of data processing circuits of said parallel arithmetic device that is temporarily halted together with a rewrite command; and data rewrite means for using said held data that are received together with said rewrite command to rewrite corresponding held data of said parallel arithmetic device that is temporarily halted.

5. The system according to claim 1, wherein said parallel arithmetic device is implemented as a single unit.

6. A data processing system for debugging at least one of operation description source code and object code that cause, for each operating cycle, successive transitions of operation states of a plurality of stages of a parallel arithmetic device, said parallel arithmetic device comprising a plurality of data processing circuits for individually executing modifiable data processing and a plurality of interconnection switching circuits for switch-controlling interconnection relations of said plurality of data processing circuits, said plurality of data processing circuits and said plurality of interconnection switching circuits being arranged in a matrix; said data processing system comprising:

an operation execution means for causing said parallel arithmetic device to execute said state transitions in accordance with said object code;

a halt input means for receiving as input a halt command for said parallel arithmetic device together with a specific operation state;

a device halt means for causing a temporary halt of said state transitions of said parallel arithmetic device during said operation state that was received together with said halt command; and a result output means for supplying as output at least one portion of held data, said interconnection relations, and operation commands of said plurality of data processing circuits of said parallel arithmetic device that has been temporarily halted.

7. The system according to claim 6, comprising:

resume input means for receiving as input a command to resume said state transitions; and an operation resumption means for causing said operation execution means to resume said state transitions upon input of said resume command.

8. The system according to claim 6, further comprising:

source input means for receiving said source code as input;

object generation means for detecting, from said source code that has been received, operation states of a plurality of stages that undergo successive transitions, and for generating a series of object code that is composed of said operation commands for each of successively switching operating cycles of said plurality of data processing circuits and said plurality of interconnection switching circuits; and a correspondence generation means for generating data that indicate correspondence between said source code and said object code;

wherein:

said halt input means receives as input line number of said source code as said operation state; and said device halt means refers to data of said correspondence and temporarily halts said state transitions of said parallel arithmetic device when said operation state corresponds to said line number that has been received as input.

9. A data processing system for debugging at least one of operation description source code and object code that cause, for each operating cycle, successive transitions of operation states of a plurality of stages of a parallel arithmetic device, said parallel arithmetic device comprising a plurality of data processing circuits for individually executing modifiable data processing and a plurality of interconnection switching circuits for switch-controlling interconnection relations of said plurality of data processing circuits, said plurality of data processing circuits and said plurality of interconnection switching circuits being arranged in a matrix; said data processing system comprising:

an operation execution means for causing said parallel arithmetic device to execute said state transitions in accordance with said object code;

a halt input means for receiving as input a halt command for said parallel arithmetic device together with a halt condition that uses at least a portion of held data of said plurality of data processing circuits;

a device halt means for temporarily halting said state transitions of said parallel arithmetic device when said halt condition is satisfied; and a result output means for supplying as output at least one portion of held data, said interconnection relations, and operation commands of said plurality of data processing circuits of said parallel arithmetic device that has been temporarily halted.

10. The system according to claim 9, further comprising:
source input means for receiving said source code as input;
object generation means for detecting, from said source code that has been received, operation states of a plurality of stages that undergo successive transitions, and for generating a series of object code that is composed of said operation commands for each of successively switching operating cycles of said plurality of data processing circuits and said plurality of interconnection switching circuits; and
a correspondence generation means for generating data that indicate correspondence between said source code and said object code;
wherein:
said halt input means receives as input a halt condition that uses a variable of said source code as said held data; and
said device halt means refers to said correspondence and temporarily halts said state transitions of said parallel arithmetic device when said held data satisfies said halt condition.

11. A data processing system for debugging at least one of operation description source code and object code that cause, for each operating cycle, successive transitions of operation states of a plurality of stages of a parallel arithmetic device, said parallel arithmetic device comprising a plurality of data processing circuits for individually executing modifiable data processing and a plurality of interconnection switching circuits for switch-controlling interconnection relations of said plurality of data processing circuits, said plurality of data processing circuits and said plurality of interconnection switching circuits being arranged in a matrix; said data processing system comprising:
a source input means for receiving said source code as input;
object generation means for detecting operation states of a plurality of stages that make successive transitions based on said source code that has been received, and generating a series of object code that is composed of operation commands for each of successively switched operating cycles of said plurality of data processing circuits and said plurality of interconnection switching circuits;
a correspondence generation means for generating data that indicate the correspondence between said source code and said object code;
an operation execution means for causing said parallel arithmetic device to execute said state transitions in accordance with said object code that has been generated;
a halt input means for receiving as input a halt command for said parallel arithmetic device together with a halt condition that uses a specific portion of said source code;
a device halt means for referring to data of said correspondence that have been generated and temporarily halting said state transitions of said parallel arithmetic device during said object code that satisfies said halt condition; and
a result output means for supplying as output at least one portion of held data, said interconnection relations, and said operation commands of said plurality of data processing circuits of said parallel arithmetic device that has been temporarily halted.

12. The system according to claim 11, wherein said result output means refers to data that indicate said correspondence that has been generated and supplies as output a portion of said source code that corresponds to said object code when said parallel arithmetic device is temporarily halted.

13. The system according to claim 11, wherein:
said source input means receives as input said source code of a plurality of lines in which variables are described;
said correspondence generation means generates data that show correspondence between: as a specific portion of said source code, said variable and said line number; and a specific portion of said object code;
said halt input means receives as input a halt condition that uses at least one of said variable and said line number as a specific portions of said source code;
said device halt means refers to data of said correspondence, and temporarily halts said state transitions of said parallel arithmetic device during object code in which said halt condition is satisfied.

14. The system according to claim 11, wherein:
said parallel arithmetic device separately includes:
a matrix circuit unit in which said plurality of data processing circuits and said plurality of interconnection switching circuits are arranged in a matrix; and
a state management unit for successively switching, for each operating cycle, operation commands of said matrix circuit unit; and
said object generation means, when generating said object code from said source code, distinguishes between data paths that correspond to said matrix circuit unit and a finite state machine that corresponds to said state management unit.

15. A data processing system for debugging at least one of operation description source code and object code that cause, for each operating cycle, successive transitions of operation states of a plurality of stages of a parallel arithmetic device, said parallel arithmetic device comprising a plurality of data processing circuits for individually executing modifiable data processing and a plurality of interconnection switching circuits for switch-controlling interconnection relations of said plurality of data processing circuits, said plurality of data processing circuits and said plurality of interconnection switching circuits being arranged in a matrix; said data processing system comprising:
an operation execution means for causing said parallel arithmetic device to execute said state transitions in accordance with said object code;
a halt input means for receiving as input a halt command for said parallel arithmetic device together with a halt condition;
a halt generation means for generating object code that causes a portion of said plurality of data processing circuits and said interconnection switching circuits to function as the halt condition circuit that temporarily halts said state transitions in accordance with a halt condition that has been received as input;
a halt insertion means for inserting object code of said halt condition circuit that has been generated into said operation description object code; and
a result output means for supplying as output at least one portion of held data, said interconnection relations, and operation commands of said plurality of data processing circuits of said parallel arithmetic device that has been temporarily halted.

16. The system according to claim 15, wherein:
said halt input means accepts an input of prescribed data;
said halt generation means generates object code for causing a portion of said plurality of data processing circuits and said interconnection switching circuits to function as a function-adding circuit for adding a prescribed function to said parallel arithmetic device in accordance with said prescribed data; and said halt insertion means inserts object code of said function-adding circuit that has been generated into said operation description object code.

17. The system according to claim 15, wherein said halt insertion means inserts object code of said halt condition circuit into said operation description object code that is executed by said parallel arithmetic device that has been temporarily halted.

18. The system according to claim 17, wherein:
said halt input means receives input of said halt command and said halt condition with said parallel arithmetic device in a temporarily halted state; and
said halt generation means generates object code of said halt condition circuit with said parallel arithmetic device in a temporarily halted state.

19. The system according to claim 15, further comprising:
source input means for receiving said source code as input;
object generation means for detecting, from said source code that has been received, operation states of a plurality of stages that undergo successive transitions, and for generating a series of object code that is composed of said operation commands for each of successively switching operating cycles of said plurality of data processing circuits and said plurality of interconnection switching circuits; and
a correspondence generation means for generating data that indicate correspondence between said source code and said object code;
wherein:
said halt input means receives as input said halt command for said parallel arithmetic device together with a halt condition that uses a specific portion of said source code;
said halt generation means refers to said correspondence and generates object code of said halt condition circuit that corresponds to said halt condition; and
said halt insertion means refers to data that indicate said correspondence and inserts object code of said halt condition circuit that has been generated into said operation description object code.

20. The system according to claim 15, wherein:
said parallel arithmetic device causes at least one portion of said plurality of data processing circuits and said interconnection switching circuits to function as logical processing circuits by means of said operation description object code;
said data processing system includes a vacant area detection means for detecting a vacant area that is composed of said data processing circuits and said interconnection switching circuits that are not used as said logical processing circuits; and
said halt generation means generates object code that causes said data processing circuits and said interconnection switching circuits of said vacant area that has been detected to function as said halt condition circuit.

21. The system according to claim 15, wherein:
said parallel arithmetic device causes at least one portion of said plurality of data processing circuits and said interconnection switching circuits to function as logical processing circuits by means of said operation description object code;
said data processing system includes an arrangement adjusting means for causing said object generation means to re-generate object code of said logical processing circuits such that a vacant area is introduced for inserting said halt condition circuit of the object code that has been generated by said halt generation means; and said halt insertion means inserts object code of said halt condition circuit into said operation description object code such that said halt condition circuit is inserted in said vacant area.

22. The system according to claim 15 wherein:
said parallel arithmetic device causes at least one portion of said plurality of data processing circuits and said interconnection switching circuits to function as logical processing circuits by means of said operation description object code;
said object generation means generates object code of said logical processing circuits such that a vacant area is introduced in advance in which said halt condition circuit can be inserted;
said halt insertion means inserts object code of said halt condition circuit into said operation description object code such that said halt condition circuit is inserted in said vacant area.

23. A data processing system for generating, from operation description source code that causes, for each operation cycle, successive transitions of operation states of a plurality of stages of a parallel arithmetic device, object code of said parallel arithmetic device; said parallel arithmetic device comprising a plurality of data processing circuits for individually executing modifiable data processing and a plurality of interconnection switching circuits for switch-controlling interconnection relations of said plurality of data processing circuits, said plurality of data processing circuits and said plurality of interconnection switching circuits being arranged in a matrix, said object code being composed of operation commands of said plurality of data processing circuits and said plurality of interconnection switching circuits that are successively switched for each of operating cycles; said data processing system comprising:
a source input means for receiving said source code as input;
object generation means for detecting, from said source code that has been received, operation states of a plurality of stages that undergo successive transitions for each of operating cycles that are successively switched and generating said object code; and
correspondence generation means for generating data that indicate correspondence between said source code and said object code.

24. A data processing method for using a parallel arithmetic device comprising a plurality of data processing circuits for individually executing modifiable data processing and a plurality of interconnection switching circuits for switch-controlling interconnection relations of said plurality of data processing circuits, said plurality of data processing circuits and said plurality of interconnection switching circuits being arranged in a matrix; the method comprising the steps of:
causing said parallel arithmetic device to execute state transitions by means of operation description object code that causes, for each operating cycle, successive transitions of operation states of a plurality of stages of said parallel arithmetic device;
temporarily halting said state transitions of said parallel arithmetic device for each of said operating cycles;
reading and supplying as output at least one portion of held data, said interconnection relations, and operation commands of said plurality of data processing circuits of said parallel arithmetic device that has been temporarily halted;
accepting input of a resume command of said state transitions;

causing the resumption of said state transitions upon input of said resume command.

25. A data processing method for using a parallel arithmetic device comprising a plurality of data processing circuits for individually executing modifiable data processing and a plurality of interconnection switching circuits for switch-controlling interconnection relations of said plurality of data processing circuits, said plurality of data processing circuits and said plurality of interconnection switching circuits being arranged in a matrix; the method comprising the steps of:

receiving input of a halt command for said parallel arithmetic device and a specific operation state;

causing said parallel arithmetic device to execute state transitions by means of operation description object code that causes, for each operating cycle, successive transitions of operation states of a plurality of stages of said parallel arithmetic device;

temporarily halting said state transitions of said parallel arithmetic device at the time of said specific operation state that has been received as input together with said halt command; and reading and supplying as output at least one portion of held data, said interconnection relations, and operation commands of said plurality of data processing circuits of said parallel arithmetic device that has been temporarily halted.

26. The data processing method for using a parallel arithmetic device comprising a plurality of data processing circuits for individually executing modifiable data processing and a plurality of interconnection switching circuits for switch-controlling interconnection relations of said plurality of data processing circuits, said plurality of data processing circuits and said plurality of interconnection switching circuits being arranged in a matrix; the method comprising the steps of:

receiving input of a halt command for said parallel arithmetic device and a halt condition that uses at least a portion of held data of said plurality of data processing circuits;

causing said parallel arithmetic device to execute state transitions by means of operation description object code that causes, for each operating cycle, successive transitions of operation states of a plurality of stages of said parallel arithmetic device;

temporarily halting said state transitions of said parallel arithmetic device when said halt condition is satisfied; and reading and supplying as output at least one portion of held data, said interconnection relations, and operation commands of said plurality of data processing circuits of said parallel arithmetic device that has been temporarily halted.

27. The data processing method for using a parallel arithmetic device comprising a plurality of data processing circuits for individually executing modifiable data processing and a plurality of interconnection switching circuits for switch-controlling interconnection relations of said plurality of data processing circuits, said plurality of data processing circuits and said plurality of interconnection switching circuits being arranged in a matrix; the method comprising the steps of:

accepting source code as input;

detecting, from said source code that has been accepted, operation states of a plurality of stages that undergo successive transitions, and generating a series of object code that describes operations that cause successive transitions of operation states of a plurality of stages of said parallel arithmetic device, and that is composed of, for each of operating cycles that are successively switched, operation commands of said plurality of data processing circuits and said plurality of interconnection switching circuits;

generating data that indicate correspondence between said source code and said object code;

receiving input of a halt command for said parallel arithmetic device and a halt condition that uses a specific portion of said source code;

causing said parallel arithmetic device to execute said state transitions by means of said object code that has been generated;

referring to said data of correspondence that have been generated and temporarily halting said state transitions of said parallel arithmetic device at a time of said object code in which said halt condition is satisfied; and reading and supplying as output at least one portion of held data, said interconnection relations, and said operation commands of said plurality of data processing circuits of said parallel arithmetic device that has been temporarily halted.

28. A data processing method for using a parallel arithmetic device comprising a plurality of data processing circuits for individually executing modifiable data processing and a plurality of interconnection switching circuits for switch-controlling interconnection relations of said plurality of data processing circuits, said plurality of data processing circuits and said plurality of interconnection switching circuits being arranged in a matrix; the method comprising the steps of:

receiving as input a halt command for said parallel arithmetic device and a halt condition;

generating object code for causing a portion of said plurality of data processing circuits and said interconnection switching circuits to function as a halt condition circuit for temporarily halting said state transitions by means of said halt condition that has been received;

inserting object code of said halt condition circuit that has been generated into operation description object code that causes, for each operating cycle, successive transitions of operation states of a plurality of stages of said parallel arithmetic device;

causing said parallel arithmetic device to execute said state transitions by means of said operation description object code following insertion; and reading and supplying as output at least one portion of held data, said interconnection relations, and operation commands of said plurality of data processing circuits of said parallel arithmetic device that has been temporarily halted.

29. A parallel arithmetic device that causes, for each operating cycle, successive transitions of operation states of a plurality of stages in accordance with object code, said parallel arithmetic device comprising:

a plurality of data processing circuits for individually executing modifiable data processing;

a plurality of interconnection switching circuits for switch-controlling interconnection relations of said plurality of data processing circuits;

temporary halt means for temporarily halting state transitions in accordance with at least external input; and transition resumption means for, in accordance with external input, causing resumption of said state transitions that have been temporarily halted;

wherein said plurality of data processing circuits and said plurality of interconnection switching circuits are arranged in a matrix; and a result output means of supplying as output at least one portion of held data, said interconnection relations, and operation commands of said plurality of said data processing circuits of said parallel arithmetic device that has been temporarily halted.

30. The parallel arithmetic device according to claim 29, separately comprising:

a matrix circuit unit in which said plurality of data processing circuits and said plurality of interconnection switching circuits are arranged in a matrix; and a state management unit for successively switching, for each operating cycle, operation commands of said matrix circuit unit, said state management unit including said temporary halt means and said transition resumption means.

* * * * *